May 26, 1931. C. S. BRAGG ET AL 1,807,277
VACUUM BRAKE SYSTEM
Filed Sept. 12, 1929 2 Sheets-Sheet 1
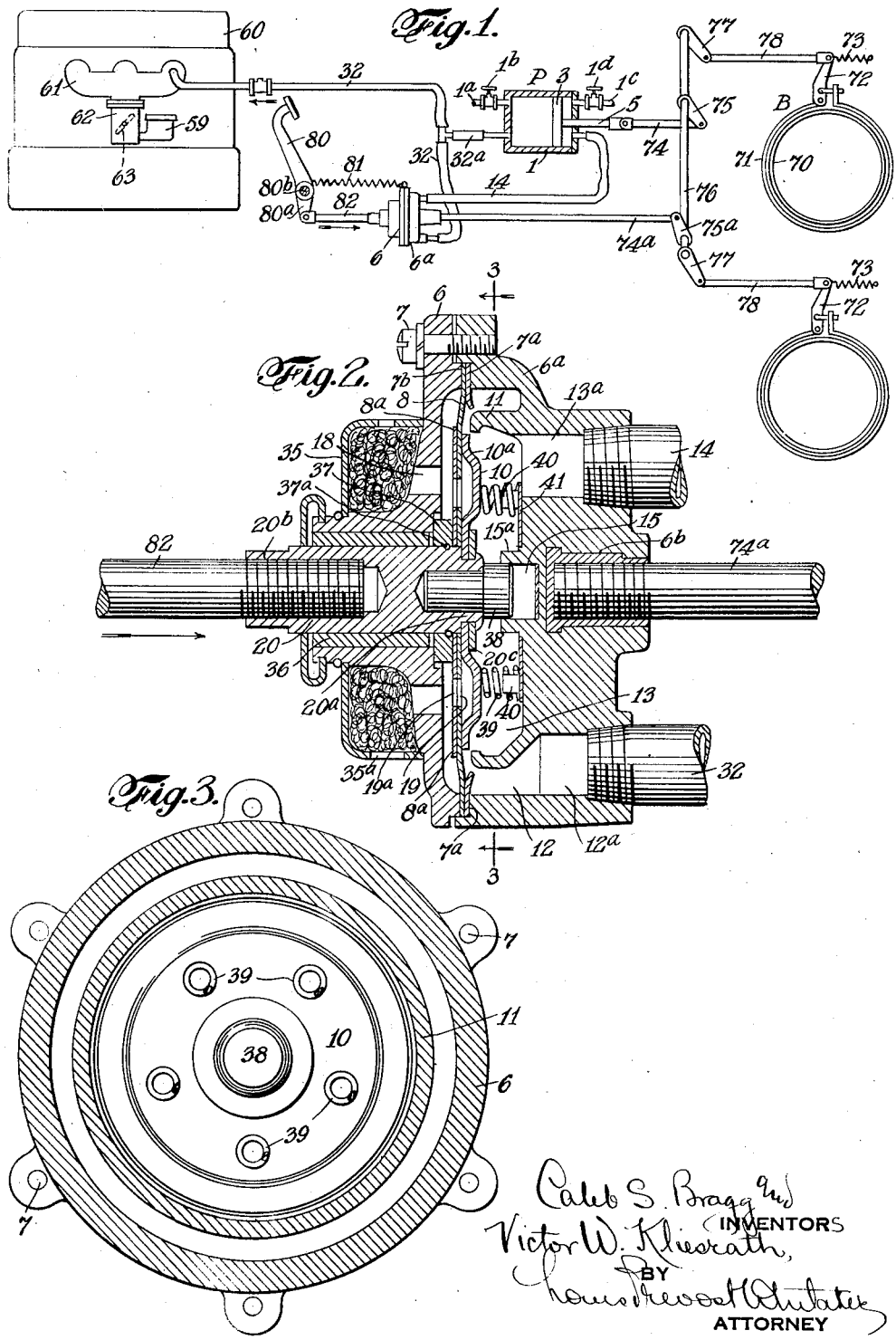

May 26, 1931.  C. S. BRAGG ET AL  1,807,277
VACUUM BRAKE SYSTEM
Filed Sept. 12, 1929  2 Sheets-Sheet 2

Patented May 26, 1931

1,807,277

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

VACUUM BRAKE SYSTEM

Application filed September 12, 1929. Serial No. 392,004.

Our invention consists in the novel features hereinafter described, reference being had to the accompanying drawings which illustrate two embodiments of the invention selected by us for purposes of illustration, and the said invention is fully disclosed in the following description and claims.

Our present invention is an improvement in vacuum brake systems for automotive vehicles and has for its leading feature improvements in valve mechanism for controlling the power actuator or actuators thereof. In our former application for Letters Patent of the United States filed November 7, 1927, and given Serial No. 231,724, we have shown a valve mechanism for controlling a power actuator or actuators in which the piston is submerged in the higher fluid pressure, ordinarily atmosphere, the lower fluid pressure, ordinarily sub-atmospheric or partial vacuum, being conveniently obtained from the suction passage of the internal combustion engine which propels the vehicle or vehicles.

The valve mechanism which constitutes the leading feature of our present invention is designed and constructed so as to control a power actuator or actuators in which the piston is submerged in the lower fluid pressure or vacuum and is inserted in the rodding to which the physically operable part, usually the pedal lever, is connected, the rodding preferably extending to brake mechanism of the vehicle, and the valve mechanism being constructed so as to permit the operator to apply his physical force to the brake mechanism to which said rodding is connected in addition to the power of the actuator, or to operate said brake mechanism by physical force alone in case of failure of power.

Our invention comprises the novel features of construction and combination of parts hereinafter fully described and particularly pointed out in the claims.

In the accompanying drawings in which we have shown two embodiments of the invention selected by us for purposes of illustration, Fig. 1 is a diagrammatic representation of a brake system for an automotive vehicle embodying our improved valve mechanism, in which the rodding is connected to the pedal lever so as to be subjected to a pushing action.

Fig. 2 is an enlarged sectional view of the valve mechanism shown in Fig. 1.

Fig. 3 is a vertical transverse section of the valve mechanism on the line 3—3 of Fig. 2.

Figure 4:
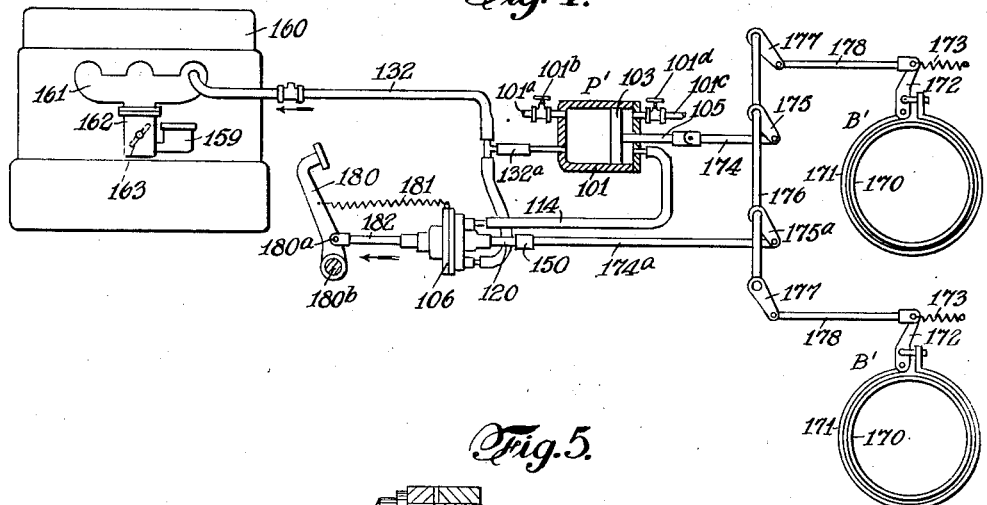
Fig. 4 is a view similar to Fig. 1, showing a slight modification in that the pedal exerts a pulling action on the rodding.

Referring to the embodiment of our invention illustrated in Figs. 1, 2 and 3, 6ª represents the main body of the valve casing, which is conveniently formed as a casting and is provided with an annular wall having a clamping face, indicated at 7ª, to receive the marginal portion of a flexible diaphragm, 8, of any suitable material, which is clamped in sealing engagement with the main body, in this instance by means of a casing member, 6, provided with annular clamping portions, 7, the casing members being united and clamped upon the marginal portions of the diaphragm by any suitable means, as the screws, 7ᵇ. The main body, 6ª, is provided within the same with an annular seat, 17, adapted to engage the diaphragm, and this seat, 11, when the diaphragm is seated thereon, divides the space within the main body into an annular suction chamber, 12, exterior to the seat, and a centrally located chamber, 13, within the seat. The main body is also provided wth a passage, 12ª, communicating with the suction chamber and having means for receiving a pipe connection, to wit, the suction pipe, 32, for connecting it with the source of suction or lower fluid pressure, as hereinafter described, and the main body is further provided with a passage, 13ª, communicating with the chamber, 13, and provided with means for receiving a pipe connection, as the pipe, 14, which connects it with the closed end of the actuator cylinder in rear of the piston thereof. The main body, 6ª, is also provided with means for connecting it with the brake rodding. In this instance we have shown the main body, 6ª, provided with an interiorly threaded attaching sleeve, 6ᵇ, around which the casting for the main body is cast, or any other form of attaching means may be employed. The central portion of the main body within the chamber, 13, is also provided with a guiding recess, 15, which is preferably surrounded by an annular stop flange, 15ª, projecting into said chamber, as shown, although this is not essential. The diaphragm, 8, is provided with a plurality of higher pressure inlet apertures, indicated at 19, in this instance communicating with the atmosphere, and is preferably provided with a reinforcing disc or plate, indicated at 8ª, which is provided with registering apertures, 19ª. The casing member, 6, is provided with a plurality of inlet apertures, indicated at 18, in this instance establishing communication with the atmosphere through a dust cover, 35, provided with apertures, 35ª, and preferably containing hair or other fibrous material. Within the chamber, 13, as a disc valve, 10, provided with an annular seat, 10ª, for engaging the diaphragm and closing communication beeween the apertures, 19, therein and the chamber, 13. The central portions of the diaphragm and its reinforcing plate and disc valve are carried by a valve actuating part, 20, which in this instance extends through a central aperture in the casing member, 6, which may be provided with a guiding or bearing sleeve, 36, but it is not necessary to provide any sealing means at this point, as the suction is confined to the portion of the valve mechanism on the other side of the diaphragm at all times, whether the diaphragm is seated or unseated. We find it convenient to assemble the diaphragm and disc valve in connection with the valve actuating part, 20, before placing the same in the valve casing, and to this end the valve actuating part, 20, is conveniently provided at its inner end with a portion of reduced diameter, indicated at 20ª, engaged by a central aperture in the disc valve, which is held rigidly against the shoulder so formed by a clamping washer, 20ᵇ, over which the inner end of the valve actuating part is conveniently swaged or headed, as shown. The diaphragm is provided with a central aperture fitting the portion of the part, 20, of larger diameter, as is the reinforcing plate or disc, 8ª, when used, and the diaphragm and reinforcing disc are clamped against the central portion of the disc valve by means of a stop collar, 37, secured to the part, 20, in any desired manner, as by a spring locking ring, 37ª, as shown, the stop ring, 37, engaging the casing member, 6, and limiting the movement of the valve actuating part, 20, in one direction. The movement of the valve actuating part in the opposite direction is limited by the engagement of the inner end of the sleeve with the flange, 15ª, on the valve body, 6ª, and we prefer to provide the inner end of the valve actuating part, 20, with guiding means, consisting in this instance of a projection or guiding stud, 38, which engages the recess, 15, in the valve body, 6ª. This projection may be formed integrally with the part, 20, but is shown as formed separately and provided with a stem, 38ª, pressed or otherwise secured in a recess at the inner end of the part, 20. The valve actuating part, 20, is also provided with means for connecting it with the brake rodding, being in this instance provided with an interiorly threaded recess, 20ᵇ.

Yielding means are provided for holding the disc valve, 10, seated on the diaphragm so as to close the air inlet apertures, 19, therein and the diaphragm unseated from the seat, 11, so as to normally connect the chamber, 13, and the portion of the power actuator connected therewith with the source of vacuum when the parts are in the released position, thus holding the valve actuating part at one extreme of movement with the stop, 37, in engagement with the casing member, 6. In this instance we have shown a circular series of coil springs, 39, interposed between the disc valve and the casing member, 6ª, said springs being held in proper position in any suitable way, in this instance by means of studs, 40, on a plate, 41, engaging the wall of the chamber, 13, and provided with a central aperture fitting over the stop flange, 15ª. These springs also constitute a yielding resistance which is applied in a direction contrary to that in which the valve actuating part, 20, is moved by the depression of the pedal, as hereinafter described, and any pressure exerted by these springs is therefore transmitted to the foot of the operator. When the parts are in released position, as shown in Fig. 2, and the chamber, 13, and suction chamber, 12, are exhausted, the pressure of the atmosphere will be exerted upon the diaphragm and disc valve over a major surface, equivalent to the annular portion of the diaphragm between its connection with the valve actuating part and the marginal portions, and the springs, 39, are calibrated so that their combined resistance is nearly counterbalanced by the maximum differential of fluid pressures existing on the diaphragm and disc valve when the parts are in the released position shown in Fig. 2.

In Fig. 1, we have illustrated diagrammatically a brake system for automotive vehicles embodying the valve mechanism just described. In this figure the brake mechanisms for the vehicle are indicated diagrammatically at B, B, and may be of any desired type and applied to any desired number of wheels of the vehicle. By way of example, we have shown each of these brake mechanisms comprising a brake drum, 70, brake band, 71, brake applying lever, 72, and retracting spring, 73. The brake applying levers, 72, are connected by links, 78, 78, with arms, 77, 77, on a rock shaft, 76, for joint operation. 1 represents the cylinder of a power actuator, indicated as a whole at P, of the type in which the piston is submerged in the lower fluid pressure, or as we term it, vacuum-balanced. The cylinder, 1, is closed at both ends and is provided with a piston, 3, the piston rod, 5, of which is connected by a link rod, 74, with an arm, 75, on the rock shaft, 76. The valve mechanism previously described is inserted in rodding or linkage connecting the physically operable part, as the pedal lever, 80, with brake mechanism of the vehicle. In this instance the pedal lever is provided with a depending arm, 80ª, below the pivot, 80ᵇ, which connects it with the chassis of the vehicle, and may also be provided, as shown, with the usual retracting spring which, however, need not be of greater strength than necessary to counterbalance the weight of the pedal lever. The rock shaft, 76, is provided with an arm, 75ª, and the valve casing and valve actuating part are connected the one with the arm, 80ª, and the other with the arm, 75ª. In this instance the arm, 80ª, of the pedal lever is connected by link, 82, with the valve actuating part, 20, and the valve casing is connected by link, 74ª, with the arm, 75ª, the construction being such that when the lost motion provided between the valve actuating part and the casing is taken up, the operator can apply his physical force to the brake mechanism in addition to that of the actuator, or to apply the brakes by physical force in case of failure of power.

In Fig. 1, 60 represents the internal combustion engine which propels the vehicle and which is provided with the intake manifold, 61, connected with the vertical passage, 62, and constituting with the manifold the suction passage of the engine. 59 represents the carburetor, and 63 the usual throttle valve in the suction passage. 32 represents the suction pipe, which is connected at one end to the suction passage of the engine between the throttle valve and the engine cylinders, and preferably to the intake manifold, as shown, and extends to and is connected with the suction chamber, 12, of the valve mechanism, a portion of the piping adjacent to the valve mechanism being flexible to permit the bodily movements of the valve mechanism with the rodding. The portion of the actuator cylinder, 1, forward of the piston is connected at all times with the suction passage of the engine independently of the valve mechanism, and in this instance we have shown the pipe, 32, provided with a branch pipe, 32ª, connected with the forward end of cylinder, 1.

It will be understood that the valve mechanism is capable of controlling a plurality of actuators of the kind illustrated in Fig. 1, if desired, and we have shown the cylinder, 1, provided on opposite sides of the piston with pipes, 1ª, 1ᶜ, for connecting an additional actuator or actuators, said pipes being provided with cut-off valves, indicated at 1ᵇ, 1ᵈ, for closing them when their use is not required. When the parts are in the released position, the valve mechanism will be in the position illustrated in Fig. 2, and when the engine is running air will be exhausted from the brake cylinder, 1, forward of the piston through the pipe, 32ª, and from the portion of the cylinder in rear of the piston through the pipe, 14, chamber, 13, suction chamber, 12, and suction pipe, 32, thus maintaining the piston submerged in vacuum or vacuum-balanced. Under these conditions, as before stated, the resistance springs, 39, are holding the disc valve seated on the diaphragm, and the diaphragm unseated, and as the forward face of the diaphragm is subjected to atmospheric pressure and the inner face subjected to vacuum, the pressure of the springs, 39, is nearly counterbalanced, and said springs, 39, therefore offer only a slight initial resistance to be overcome by the operator in effecting the initial movement of the valve actuating part, 21, to apply the brakes.

When the operator desires to apply the brakes, he will place his foot upon the pedal and depress it, which will effect a rearward movement of the pedal, 80ª, in the direction of the arrow Fig. 1, against the initial resistance offered by the springs, 39, in their then nearly counterbalanced condition. This will move the valve actuating part, 20, in the direction of the arrow Fig. 2, with respect to the valve casing, and will first seat the diaphragm on the seat, 11, thereby disconnecting the rear end of the actuator cylinder from suction. Thereafter the disc valve will be unseated from the diaphragm, thus admitting air from the atmosphere into chamber, 13, and into the portion of the actuator cylinder in rear of the piston. It is to be noted that as the diaphragm is of greater area than the disc valve when the parts are in released position as in Fig. 2, and the disc valve is seated on the diaphragm, the air pressure acts upon a surface substantially equal to the area of the diaphragm and including proportions which extend over the suction passage. When the diaphragm is seated on the seat, 11, by the first portion of the pedal movement against the initial pressure of the springs, 39, the seat, 11, will immediately take up part of the counterbalancing effect of the air pressure and leave only the pressure on the outer face of the disc valve to offset the pressure of the springs, 39, so that an additional amount of pressure of said springs is immediately transmitted to the foot of the operator who must overcome this additional force by additional pressure in order to effect the unseating of the disc valve. As soon as the disc valve is unseated, the pressure rises in the chamber, 13, and in the portion of the actuator cylinder connected therewith, and such increase in pressure will gradually offset the atmospheric pressure on the outer face of the diaphragm. The result is that the force of the springs, 39, will be gradually transmitted to the foot of the operator through the disc valve, part, 20, and the connections to the pedal lever, so that as the pressure rises in the actuator in rear of the piston, moving it forward and applying the brakes with increasingly greater force, it will require a correspondingly increasing amount of force to be exerted by the operator on the pedal to keep the disc valve unseated, and thus the operator is apprised as to the extent to which the actuator is applying the brakes by power. In other words, the springs, 39, present a minimum initial resistance to the physically operable part in the movement thereof to close the suction valve, i. e., to seat the diaphragm, and immediately exert increased resistance to the opening of the atmospheric valve, i. e., the unseating of the disc valve from the diaphragm, and thereafter the force of the springs is transmitted increasingly to resist the operator operated part in holding the disc valve open and the diaphragm closed proportionate to the decrease of the differential of fluid pressures on the disc valve or atmospheric valve only.

At the same time the valve has a follow-up effect, which permits the brakes to be applied with successive increases in braking force. Thus if the operator, after effecting the seating of the diaphragm and the unseating of the disc valve, and thus initiating the piston movement of the actuator, stops the forward movement of his foot, the valve casing which is connected with the piston of the actuator through the rock shaft, 76, and therefore moves with the piston, will be moved with relation to the part, 20, in a direction opposite to that indicated by the arrow in Fig. 2, thereby seating the disc valve on the diaphragm. This shuts off the further admission of the higher pressure fluid or atmosphere, and holds the brakes as applied in any intermediate position, and this action can be repeated until the brakes are applied with the maximum force of the actuator. It will be seen that the operator can, by further depressing the pedal so as to take up the lost motion provided, in this instance between the part, 20, and the stop flange, 15ª, of the valve casing, add his physical force directly through to the brake mechanism to which the link rod, 74ª, is connected in addition to the power of the actuator. In like manner the operator can apply the brakes by physical force alone in case the engine is not running or in case of any other failure of power, and in such case the valves will be brought into such a position, i. e., with the diaphragm seated and the disc valve unseated therefrom, so as to vent the rear end of the cylinder of the actuator, the forward end being vented through the suction pipe, so that the actuator will offer no resistance to a physical application of the brakes when power is not available for any reason, beyond the friction of the piston. If the operator desires to relieve the brakes gradually, it is only necessary to relieve the pressure of the foot on the pedal sufficiently to permit the springs, 39, to reseat the disc valve on the diaphragm and thereafter unseat the diaphragm from the seat, 11, when there will be effected an equalization of pressures on opposite sides of the piston and an immediate reduction of pressure in rear of the diaphragm and disc valve. The differential of fluid pressures on the opposite faces of the diaphragm and disc valve, including the portions of the diaphragm beyond the edge of the disc valve, will immediately counterbalance a portion of the force of the springs, 39, and relieve the foot of the operator of a portion of their force. The equalization of pressures on the piston will permit the immediate release of the brake mechanisms under the action of their retracting means. Thereafter, as the air previously admitted is withdrawn from the actuator cylinder on both sides of the actuator piston, the piston and brake mechanisms move toward the released position, and the increase in the differential of fluid pressures on the opposite faces of the diaphragm and disc valve will further counterbalance the force of the springs, 39, and further relieve the operator's foot from pressure, as the pedal is permitted to rise during such return movement of the piston. At any point during the return stroke of the piston the operator can check the return movement thereof, by exerting greater pressure on the pedal sufficient to stop its return movement when the slight continuing movement of the piston will shift the valve casing with respect to the valves so as to again seat the diaphragm, and can reapply the brakes by a further movement of the pedal to unseat the disc valve. In the manner described, the operator can gradually release the brakes and will be able to determine by the decrease in the reactionary pressure on his foot the extent to which the brakes are being relieved. If it is desired to return the parts immediately to their released positions, it is only necessary for the operator to remove his foot from the pedal altogether when the pressures on opposite faces of the actuator piston will be equalized, as before described, permitting the immediate release of the brakes, and as the air previously admitted is withdrawn into the suction passage, the retracting springs will return all the parts to their released positions.

Figure 5:
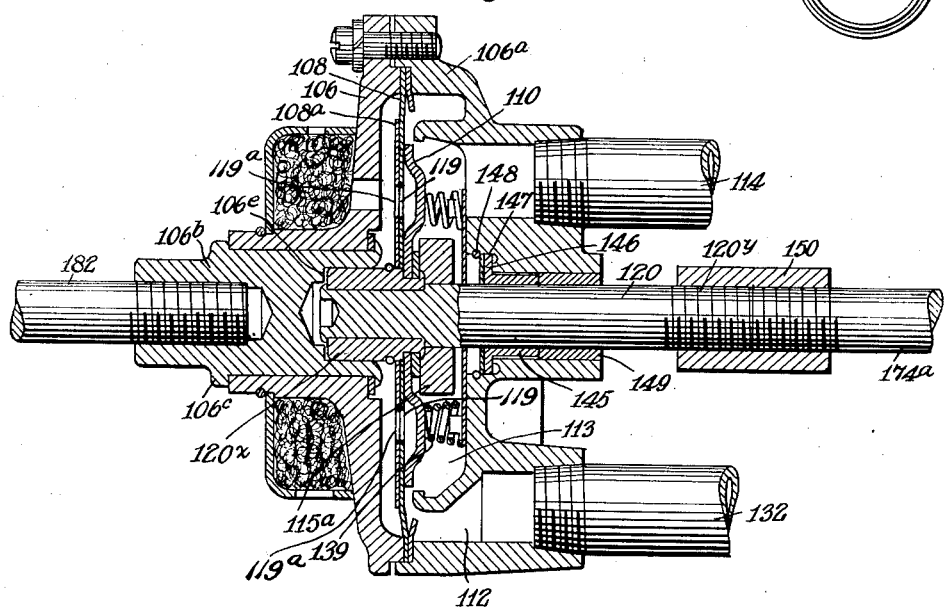
Fig. 5 is a sectional view of the valve mechanism shown in Fig. 4, illustrating the slight modification of the parts necessary to adapt it for use in the brake system illustrated therein.

In Figs. 4 and 5 we have shown an embodiment of our invention in which the valve mechanism is operated by a pulling movement instead of a pushing movement, as hereinbefore described. In these figures the brake mechanisms are indicated at $B^1$, $B^1$, and the power actuator at $P^1$, and the parts which correspond with those previously described are given the same reference numerals with the addition of 100. In this construction it will be noted that the link, 182, connects the pedal lever, 180, at a point, $180^a$, above its pivotal point, $180^b$, with the valve casing, while the link rod, $174^a$, extending to the brake mechanism is connected with the diaphragm and disc valve. The valve casing is constructed somewhat differently in order to accommodate these changes. As shown in Fig. 5, the casing member, 106, of the valve casing is provided with a coupling member, $106^b$, having an internally threaded recess into which a threaded portion of the rod, 182, is secured. The coupling member is preferably provided outside the hub of the casing member, 106, with a shoulder, $106^c$, and the inner end of the coupling member is swaged or headed over, preferably upon a washer, $106^d$, to secure it in position. The valve actuating part, 120, in this instance extends through a central aperture in the casing member or body, $106^a$, and as the inner end of this aperture communicates with chamber, 113, which is usually subjected to vacuum, it is necessary to seal it. To this end the said aperture is provided with a sealing means, indicated at 145, and comprising in this instance a sleeve of molded rubber, cork or other suitable material, having a central aperture to fit the valve actuating part, 120, and having an annular flange, 146, engaging a recess in the chamber, 113. The sealing means are held in place by a washer, 147, and spring ring, 148, as shown, or in any other desired manner.

The inner end of the valve stem or valve actuating part, 120, is provided with a reduced portion at its inner end carrying a sleeve, $120^x$, to the inner end of which are secured the disc valve, 110, the diaphragm, 108, and the reinforcing plate, $108^a$, in the manner previously described. The coupling member, $106^b$, is conveniently recessed, as indicated at $106^e$, to accommodate the sleeve, $120^x$, and serve as a guiding means for the longitudinal movement of said sleeve and the valve actuating stem, 120, and said stem is further guided by a bearing, 149, in the central aperture of the casing member, $106^a$.

In this construction the lost motion between the valve actuating part or stem, 120, and the valve casing is limited in one direction by the engagement of the sleeve, $120^x$, with the inner end of the recess, $106^e$, and in the other direction by the stop collar, $115^a$, on said stem adapted to engage the rear face of the chamber, 113, in the casing member, $106^a$. The valve actuating part or stem, 120, is in this instance provided outside of the valve casing with a threaded portion connected by a screw collar, 150, for example, with a threaded portion of the link rod, $174^a$. In the construction shown in Fig. 5, the resistance springs, 139, are mounted in the manner previously described between the rear face of the chamber, 113, and the disc valve, 110, and hold the disc valve seated and the diaphragm unseated in the released position of the parts shown in Fig. 5. The operation of the valve mechanism illustrated in Figs. 4 and 5 is exactly the same in all respects as that previously described with reference to Figs. 1, 2 and 3, except that the forward movement of the pedal moves the valve casing with respect to the valve actuating stem instead of moving the stem with respect to the casing, as in the preceding figures, and the description of the operation need not therefore be repeated. We prefer to make this valve mechanism in the two forms shown, in order to facilitate the application of a power actuator in accordance with the design and construction of different types of automotive vehicles.

What we claim and desire to secure by Letters Patent is:—

1. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with a part connected with the vehicle, said valve body being provided with means for connecting said central chamber with a power actuator and for connecting said suction chamber with a source of suction, and yielding resistance means interposed between the valve body and a part connected with the valve actuating part, and normally holding said disc valve seated and the diaphragm unseated.

2. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with a part connected with the vehicle, said valve body being provided with means for connecting said central chamber with a power actuator and for connecting said suction chamber with a source of suction, and yielding resistance means interposed between the valve body and a part connected with the valve actuating part, and normally holding said disc valve seated and the diaphragm unseated, said yielding resistance means being calibrated so as to be nearly counterbalanced by the maximum differential of fluid pressures to which the opposite faces of the diaphragm and disc valve are exposed when in said position.

3. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with brake mechanism, said yielding resistance means being calibrated so as to be nearly counterbalanced by the maximum differential fluid pressures to which the opposite faces of the diaphragm and disc valve are exposed when in said position, and means for limiting the lost motion between the valve actuating part and the valve body to connect the physically operable part with said brake mechanisms.

4. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with a part connected with the vehicle, said valve body being provided with means for connecting said central chamber with a power actuator and for connecting said suction chamber with a source of suction, and yielding resistance means interposed between said valve body and said disc valve, and normally holding the disc valve seated on the diaphragm and the diaphragm unseated.

5. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with a part connected with the vehicle, said valve body being provided with means for connecting said central chamber with a power actuator and for connecting said suction chamber with a source of suction, and yielding resistance means interposed between said valve body and said disc valve, and normally holding the disc valve seated on the diaphragm and the diaphragm unseated, said yielding resistance means being calibrated so as to be nearly counterbalanced by the maximum differential of fluid pressures to which the opposite faces of the diaphragm and disc valve are exposed when in such position.

6. In a valve mechanism of the kind described, the combination with a valve body provided with an annular seat, a diaphragm for engaging said seat provided with inlet apertures for higher fluid pressure, and having marginal portions in sealing engagement with the valve body, said diaphragm when seated dividing the adjacent space within the casing into a central chamber and an annular suction chamber, a disc valve of smaller diameter than the diaphragm, having a seat for engaging the diaphragm and closing communication through said apertures, a valve actuating part movable with respect to the valve body and connected with said diaphragm and disc valve, said valve actuating part and said casing being provided with means for connecting them respectively with a physically operable part and with a part connected with the vehicle, said valve body being provided with means for connecting said central chamber with a power actuator and for connecting said suction chamber with a source of suction, and yielding resistance means interposed between said valve body and said disc valve, and normally holding the disc valve seated on the diaphragm and the diaphragm unseated, said yielding resistance means being calibrated so as to be nearly counterbalanced by the maximum differential of fluid pressures to which the opposite faces of the diaphragm and disc valve are exposed when in such position, and means for limiting the lost motion between the valve actuating part and the valve body.

7. In a vacuum brake system for automotive vehicles provided with an internal combustion engine having a throttle controlled suction passage, the combination with a power actuator comprising a cylinder closed at both ends and a piston provided with means for connecting it with brake mechanism, and means for connecting the actuator cylinder forward of the piston at all times with said suction passage, of controlling valve mechanism for said actuator comprising a valve body provided with an annular seat, a diaphragm for engaging said seat and dividing the adjacent space within the valve body into a central chamber and an annular suction chamber, said diaphragm having marginal portions in sealing engagement with the valve body and being provided with air inlet apertures to communicate with said central chamber, a disc valve of smaller diameter than said diaphragm located within said seat and having a seat for engaging the diaphragm, and closing communication through said apertures, a valve actuating part movable with respect to the valve body and connected with said diaphragm and disc valve, tubular connections from said central chamber to the actuator cylinder in rear of the piston, means for connecting said annular suction chamber with said suction passage, yielding resistance means interposed between said valve body and a part connected with the valve actuating part for holding said disc valve seated on the diaphragm and the diaphragm unseated, a physically operable part for the valve mechanism, said valve actuating part and valve body being connected the one with said physically operable part and the other with a part connected with the vehicle.

8. In a vacuum brake system for automotive vehicles provided with an internal combustion engine having a throttle controlled suction passage, the combination with a power actuator comprising a cylinder closed at both ends and a piston provided with means for connecting it with brake mechanism, and means for connecting the actuator cylinder forward of the piston at all times with said suction passage, of controlling valve mechanism for said actuator comprising a valve body provided with an annular seat, a diaphragm for engaging said seat and dividing the adjacent space within the valve body into a central chamber and an annular suction chamber, said diaphragm having marginal portions in sealing engagement with the valve body and being provided with air inlet apertures to communicate with said central chamber, a disc valve of smaller diameter than said diaphragm located within said seat and having a seat for engaging the diaphragm, and closing communication through said apertures, a valve actuating part movable with respect to the valve body and connected with said diaphragm and disc valve, tubular connections from said central chamber to the actuator cylinder in rear of the piston, means for connecting said annular suction chamber with said suction passage, yielding resistance means interposed between said valve body and a part connected with the valve actuating part for holding said disc valve seated on the diaphragm and the diaphragm unseated, a physically operable part for the valve mechanism, said valve actuating part and valve body being connected the one with said physically operable part and the other with a part connected with the vehicle, said yielding resistance means being calibrated so as to be nearly counterbalanced by the differential of fluid pressures on the opposite faces of the diaphragm and disc valve when in released position.

9. In a vacuum brake system for automotive vehicles provided with an internal combustion engine having a throttle controlled suction passage, the combination with a power actuator comprising a cylinder closed at both ends and a piston provided with means for connecting it with brake mechanism, and means for connecting the actuator cylinder forward of the piston at all times with said suction passage, of controlling valve mechanism for said actuator comprising a valve body provided with an annular seat, a diaphragm for engaging said seat and dividing the adjacent space within the valve body into a central chamber and an annular suction chamber, said diaphragm having marginal portions in sealing engagement with the valve body and being provided with air inlet apertures to communicate with said central chamber, a disc valve of smaller diameter than said diaphragm located within said seat and having a seat for engaging the diaphragm, and closing communication through said apertures, a valve actuating part movable with respect to the valve body and connected with said diaphragm and disc valve, tubular connections from said central chamber to the actuator cylinder in rear of the piston, means for connecting said annular suction chamber with said suction passage, yielding resistance means interposed between said valve body and a part connected with the valve actuating part for holding said disc valve seated on the diaphragm and the diaphragm unseated, a physically operable part for the valve mechanism, said valve actuating part and valve body being connected the one with said physically operable part and the other to a part connected with the actuator piston.

10. In a vacuum brake system for automotive vehicles provided with an internal combustion engine having a throttle controlled suction passage, the combination with a power actuator comprising a cylinder closed at both ends and a piston provided with means for connecting it with brake mechanism, and means for connecting the actuator cylinder forward of the piston at all times with said suction passage, of controlling valve mechanism for said actuator comprising a valve body provided with an annular seat, a diaphragm for engaging said seat and dividing the adjacent space within the valve body into a central chamber and an annular suction chamber, said diaphragm having marginal portions in sealing engagement with the valve body and being provided with air inlet apertures to communicate with said central chamber, a disc valve of smaller diameter than said diaphragm located within said seat and having a seat for engaging the diaphragm, and closing communication through said apertures, a valve actuating part movable with respect to the valve body and connected with said diaphragm and disc valve, tubular connections from said central chamber to the actuator cylinder in rear of the piston, means for connecting said annular suction chamber with said suction passage, yielding resistance means interposed between said valve body and a part connected with the valve actuating part for holding said disc valve seated on the diaphragm and the diaphragm unseated, a physically operable part for the valve mechanism, said valve actuating part and valve body being connected the one with said physically operable part and the other to brake mechanism of the vehicle, and means for limiting the lost motion between the valve actuating part and valve body.

11. In a vacuum brake system for automotive vehicles provided with an internal combustion engine having a throttle controlled suction passage, the combination with a power actuator comprising a cylinder closed at both ends and a piston provided with means for connecting it with brake mechanism, and means for connecting the actuator cylinder forward of the piston at all times with said suction passage, of controlling valve mechanism for said actuator comprising a valve body provided with an annular seat, a diaphragm for engaging said seat and dividing the adjacent space within the valve body into a central chamber and an annular suction chamber, said diaphragm having marginal portions in sealing engagement with the valve body and being provided with air inlet apertures to communicate with said central chamber, a disc valve of smaller diameter than said diaphragm located within said seat and having a seat for engaging the diaphragm, and closing communication through said apertures, a valve actuating part movable with respect to the valve body and connected with said diaphragm and disc valve, tubular connections from said central chamber to the actuator cylinder in rear of the piston, means for connecting said annular suction chamber with said suction passage, yielding resistance means interposed between said valve body and a part connected with the valve actuating part for holding said disc valve seated on the diaphragm and the diaphragm unseated, a physically operable part for the valve mechanism, said valve actuating part and valve body being connected the one with said physically operable part and the other to brake mechanism of the vehicle connected with the actuator piston, and means for limiting the lost motion between the valve actuating part and valve body, said yielding resistance means being calibrated so as to be nearly counterbalanced by the differential of fluid pressures on opposite faces of said diaphragm and disc valve when in released position.

In testimony whereof we affix our signatures.

CALEB S. BRAGG.
VICTOR W. KLIESRATH.